(12) United States Patent
Bharat et al.

(10) Patent No.: US 9,477,714 B1
(45) Date of Patent: Oct. 25, 2016

(54) METHODS AND APPARATUS FOR RANKING DOCUMENTS

(71) Applicant: Google Inc., Mountain View, CA (US)

(72) Inventors: Krishna Bharat, Palo Alto, CA (US); Jeffrey A. Dean, Palo Alto, CA (US); Michael Curtiss, Menlo Park, CA (US); Amitabh Singhal, Palo Alto, CA (US); Michael Schmitt, Zurich (CH)

(73) Assignee: Google Inc., Mountain View, CA (US)

( * ) Notice: Subject to any disclaimer, the term of this patent is extended or adjusted under 35 U.S.C. 154(b) by 46 days.

(21) Appl. No.: 14/488,795

(22) Filed: Sep. 17, 2014

Related U.S. Application Data (63) Continuation of application No. 13/299,825, filed on Nov. 18, 2011, now Pat. No. 8,843,479, which is a continuation of application No. 10/611,267, filed on Jun. 30, 2003, now Pat. No. 8,090,717.

(60) Provisional application No. 60/412,326, filed on Sep. 20, 2002.

(51) Int. Cl.
*G06F 17/30* (2006.01)

(52) U.S. Cl.
CPC ..... *G06F 17/3053* (2013.01); *G06F 17/30011* (2013.01); *G06F 17/30598* (2013.01); *G06F 17/30867* (2013.01)

(58) Field of Classification Search
CPC .................................................. G06F 17/3053
See application file for complete search history.

(56) References Cited

U.S. PATENT DOCUMENTS

| | | | |
|---|---|---|---|
| 5,293,552 A | | 3/1994 | Aalbersberg |
| 5,724,567 A | | 3/1998 | Rose et al. |
| 5,787,420 A | | 7/1998 | Tukey et al. |
| 5,907,836 A | | 5/1999 | Sumita et al. |
| 5,930,798 A | | 7/1999 | Lawler et al. |
| 6,026,388 A | * | 2/2000 | Liddy et al. |
| 6,119,124 A | | 9/2000 | Broder et al. |
| 6,275,820 B1 | | 8/2001 | Navin-Chandra et al. |
| 6,446,061 B1 | | 9/2002 | Doerre et al. |

(Continued)

FOREIGN PATENT DOCUMENTS

| | | |
|---|---|---|
| CA | 2 443 036 | 3/2005 |
| JP | 8335265 A | 12/1996 |

(Continued)

OTHER PUBLICATIONS

PCT International Search Report corresponding to PCT/US2004/030028, mailed Feb. 4, 2005, 4 pages.

(Continued)

*Primary Examiner* — Aleksandr Kerzhner
*Assistant Examiner* — Karina Levitian
(74) *Attorney, Agent, or Firm* — Patent Law Works LLP (57) ABSTRACT

Methods and apparatus are described for scoring documents in response, in part, to parameters related to the document, source, and/or cluster score. Methods and apparatus are also described for scoring a cluster in response, in part, to parameters related to documents within the cluster and/or sources corresponding to the documents within the cluster. In one embodiment, the invention may detect at least one document within the cluster; analyze a parameter corresponding to the document; and compute a cluster score based, in part, on the parameter, wherein the cluster score corresponds with at least one document within the cluster.

17 Claims, 8 Drawing Sheets

(56) References Cited

U.S. PATENT DOCUMENTS

| | | | |
|---|---|---|---|
| 6,453,315 B1 | 9/2002 | Weissman et al. | |
| 6,463,265 B1 | 10/2002 | Cohen et al. | |
| 6,480,837 B1* | 11/2002 | Dutta | G06F 17/30864 |
| 6,558,431 B1 | 5/2003 | Lynch et al. | |
| 6,594,654 B1 | 7/2003 | Salam et al. | |
| 6,601,075 B1 | 7/2003 | Huang et al. | |
| 6,647,383 B1 | 11/2003 | August et al. | |
| 6,651,057 B1* | 11/2003 | Jin | G06F 17/30675 |
| 6,654,742 B1* | 11/2003 | Kobayashi et al. | |
| 6,785,671 B1 | 8/2004 | Bailey et al. | |
| 6,804,688 B2* | 10/2004 | Kobayashi et al. | |
| 6,850,934 B2 | 2/2005 | Bates et al. | |
| 6,859,800 B1 | 2/2005 | Roche et al. | |
| 6,920,450 B2 | 7/2005 | Aono et al. | |
| 6,952,806 B1 | 10/2005 | Card et al. | |
| 6,976,170 B1* | 12/2005 | Kelly | 713/181 |
| 6,978,267 B2 | 12/2005 | Perisic et al. | |
| 6,978,419 B1 | 12/2005 | Kantrowitz | |
| 7,080,079 B2 | 7/2006 | Yu | |
| 7,200,606 B2 | 4/2007 | Elkan | |
| 7,395,222 B1 | 7/2008 | Sotos | |
| 7,451,388 B1 | 11/2008 | Henzinger et al. | |
| 7,568,148 B1 | 7/2009 | Bharat et al. | |
| 7,577,654 B2 | 8/2009 | Brants et al. | |
| 7,577,655 B2 | 8/2009 | Curtiss et al. | |
| 8,090,717 B1 | 1/2012 | Bharat et al. | |
| 8,126,876 B2 | 2/2012 | Curtiss et al. | |
| 8,225,190 B1 | 7/2012 | Bharat et al. | |
| 8,332,382 B2 | 12/2012 | Curtiss et al. | |
| 8,645,368 B2 | 2/2014 | Curtiss et al. | |
| 8,843,479 B1 | 9/2014 | Bharat et al. | |
| 2001/0003823 A1 | 6/2001 | Mighdoll et al. | |
| 2002/0032772 A1 | 3/2002 | Olstad et al. | |
| 2002/0038430 A1 | 3/2002 | Edwards et al. | |
| 2002/0073161 A1 | 6/2002 | Yamazaki et al. | |
| 2002/0073188 A1 | 6/2002 | Rawson | |
| 2002/0078035 A1 | 6/2002 | Frank et al. | |
| 2002/0103775 A1 | 8/2002 | Quass et al. | |
| 2002/0120629 A1* | 8/2002 | Leonard | 707/100 |
| 2003/0009496 A1 | 1/2003 | McBrearty et al. | |
| 2003/0014383 A1 | 1/2003 | Cho et al. | |
| 2003/0033333 A1* | 2/2003 | Nishino et al. | 707/531 |
| 2003/0061214 A1 | 3/2003 | Alpha | |
| 2003/0088554 A1 | 5/2003 | Ryan et al. | |
| 2003/0120654 A1 | 6/2003 | Edlund et al. | |
| 2003/0182270 A1 | 9/2003 | Kuno et al. | |
| 2003/0182310 A1 | 9/2003 | Charnock et al. | |
| 2003/0212704 A1 | 11/2003 | Turicchi et al. | |
| 2003/0220913 A1* | 11/2003 | Doganata et al. | 707/3 |
| 2004/0019846 A1 | 1/2004 | Castellani et al. | |
| 2005/0027699 A1 | 2/2005 | Awadallah et al. | |
| 2005/0102130 A1 | 5/2005 | Quirk et al. | |
| 2005/0203970 A1 | 9/2005 | McKeown et al. | |
| 2005/0216443 A1 | 9/2005 | Morton et al. | |
| 2005/0289140 A1 | 12/2005 | Ford et al. | |
| 2006/0089947 A1 | 4/2006 | Gallivan et al. | |
| 2006/0190354 A1 | 8/2006 | Meisel et al. | |
| 2006/0253418 A1 | 11/2006 | Charnock et al. | |
| 2006/0259476 A1 | 11/2006 | Kadayam et al. | |
| 2006/0277175 A1 | 12/2006 | Jiang et al. | |
| 2007/0022374 A1 | 1/2007 | Huang et al. | |
| 2008/0270393 A1 | 10/2008 | Doganata et al. | |

FOREIGN PATENT DOCUMENTS

| | | |
|---|---|---|
| JP | 10-171819 | 6/1998 |
| JP | 2002-092001 A | 3/2002 |
| JP | 2003-248691 A | 9/2003 |
| WO | WO 00/77689 A1 | 12/2000 |
| WO | WO 01/46870 A1 | 6/2001 |

OTHER PUBLICATIONS

Office Action from U.S. Appp. No. 12/501,256, dated Mar. 15, 2011, 24 pages.

Protest of James Stakelum, dated May 7, 2005, 9 pages.

Sakano, "Revealing the Secrets of [Google wa hitto suru] Dissecting the Search Engine," Internet Magazine, No. 79, Japan, Impress Corporation, Aug. 1, 2001, pp. 222-235. (Includes partial English translation).

Masanori Harada, "Ranking of Search Results in a Search Engine," Bit vol. 32, No. 8, Japan, Kyosan Publishing, Aug. 1, 2000, pp. 8-14. (Includes partial English translation).

Junichi Suzuki, "Latest State of Web Search Engines," WEB+DB Press, vol. 5, First Publication, Japan, Gijutsu Hyoronsha, Nov. 15, 2001, pp. 108-114. (Includes partial English translation).

Koichi Takeda, "Site-Outlining-Internet Information Gathering and Visualization Technology," Information Processing Society of Japan, Fourth vol., No. 8, Aug. 15, 2001, pp. 781-786. (Includes partial English Translation).

Sue E. Johnson et al., "Information Retrieval from Unsegmented Broadcast News Audio," SpringerLink Contemporary, Jul. 2001, pp. 251-268.

Office Action from U.S. Appl. No. 12/501,256, dated Sep. 21, 2010, 11 pages.

Tomlin, J. et al.: A New Paradigm for Ranking Pages on the World Wide Web; WWW2003, ACM, May 2003, pp. 350-355.

Henzinger et al., "Query-Free News Search," ACM, May 2003, p. 1-10.

Egghe et al., "The Influence of Publication Delays on the Observed Aging Distribution of Scientific Literature," 2000, Journal of the American Society of Information Science, p. 158-165.

Y. Rasolofo et al., "Result merging strategies for a current news metasearcher," Information Processing and Management, Elsevier Science Publishers, vol. 39, No. 4, Jul. 2003, 29 pages.

D. Zhang et al., "A novel Web usage mining approach for search engines," Computer Networks, Elsevier Science Publishers, vol. 39, No. 3, Jun. 21, 2002, 8 pages.

D. Zhang et al., "An efficient algorithm to rank Web resources," Computer Networks, Elsevier Science Publishers, vol. 33, No. 1-6, Jun. 2000, 7 pages.

G. Meghabghab, "Stochastic Simulations of Rejected World Wide Web Pages," Proceedings of the 8th International Symposium on Modeling, Analysis and Simulation of Computer and Telecommunication Systems, Aug. 29-Sep. 1, 2000, pp. 483-491.

The opening paragraph of 3.1 composition of information source in the right column of the 120th page of "Measuring Similarity among Information Sources by Comparing String Frequency Distributions", Shinya Sato et al., Information Processing Society of Japan Technical Reports, IPSJ, vol. 28, Mar. 15, 2002, pp. 119-126.

Jokela et al., "The Role of Structured Content in a Personalized News Service", 2001, Proceedings of the 34th Hawaii International Conference on System Sciences—2001, pp. 1-10.

Chen et al., "Computing and Using Reputations for Internet Ratings", ACM, (2001) pp. 154-162.

Co-Pending, U.S. Appl. No. 13/548,930 entitled "Methods and Apparatus for Clustering News Content", by Bharat et al., filed Jul. 13, 2012, 51 pages.

Office Action from U.S. Appl. No. 10/611,267, dated Oct. 26, 2010, 50 pages.

\* cited by examiner

| 560 | 565 | 570 | 575 | 580 |
|---|---|---|---|---|
|  |  |  |  |  |

METHODS AND APPARATUS FOR RANKING DOCUMENTS

CROSS REFERENCE TO RELATED APPLICATIONS

The present application is a continuation of U.S. patent application Ser. No. 13/299,825, filed Nov. 18, 2011 (now U.S. Pat. No. 8,843,479), which is a continuation of U.S. patent application Ser. No. 10/611,267 filed on Jun. 30, 2003 (now U.S. Pat. No. 8,090,717), which claims benefit of U.S. Provisional Patent Application No. 60/412,326 filed on Sep. 20, 2002, the disclosures of which are hereby incorporated by reference.

FIELD OF THE INVENTION

The present invention relates generally to organizing documents and, more particularly, to ranking the relevance of documents.

BACKGROUND OF THE INVENTION

There are many sources throughout the world that generate documents that contain content. These documents may include breaking news, human interest stories, sports news, scientific news, business news, and the like.

The Internet provides users all over the world with virtually unlimited amounts of information in the form of articles or documents. With the growing popularity of the Internet, sources such as newspapers and magazines which have historically published documents on paper media are publishing documents electronically through the Internet. There are numerous documents made available through the Internet. Often times, there is more information on a given topic than a typical reader can process.

For a given topic, there are typically numerous documents written by a variety of sources. To get a well-rounded view on a given topic, users often find it desirable to read documents from a variety of sources. By reading documents from different sources, the user may obtain multiple perspectives about the topic.

However, with the avalanche of documents written and available on a specific topic, the user may be overwhelmed by the shear volume of documents. Further, a variety of factors can help determine the value of a specific document to the user. Some documents on the same topic may be duplicates, outdated, or very cursory. Without help, the user may not find a well-balanced cross section of documents for the desired topic.

A user who is interested in documents related to a specific topic typically has a finite amount of time to locate such documents. The amount of time available spent locating documents may depend on scheduling constraints, loss of interest, and the like. Many documents on a specific topic which may be very valuable to the user may be overlooked or lost because of the numerous documents that the user must search through and the time limitations for locating these documents.

It would be useful, therefore, to have methods and apparatus for ranking documents and sources.

SUMMARY OF THE INVENTION

Methods and apparatus are described for scoring documents in response, in part, to parameters related to the document, source, and/or cluster score. Methods and apparatus are also described for scoring a cluster in response, in part, to parameters related to documents within the cluster and/or sources corresponding to the documents within the cluster. In one embodiment, the invention may detect at least one document within the cluster; analyze a parameter corresponding to the document; and compute a cluster score based, in part, on the parameter, wherein the cluster score corresponds with at least one document within the cluster.

Additional aspects of the present invention are directed to computer systems and to computer-readable media having features relating to the foregoing aspects.

BRIEF DESCRIPTION OF THE DRAWINGS

The accompanying drawings, which are incorporated in and constitute a part of this specification, illustrate one embodiment of the invention and, together with the description, explain one embodiment of the invention. In the drawings.

DETAILED DESCRIPTION

The following detailed description of the invention refers to the accompanying drawings. The detailed description does not limit the invention. Instead, the scope of the invention is defined by the appended claims and equivalents.

The present invention includes methods and apparatus for ranking documents in response to a query. The present invention also includes methods and apparatus for creating clusters. Those skilled in the art will recognize that many other implementations are possible, consistent with the present invention.

The term "document" may include any machine-readable or machine-storable work product. A document may be a file, a combination of files, one or more files with embedded links to other files. These files may be of any type, such as text, audio, image, video, and the like. Further, these files may be formatted in a variety of configurations such as text, HTML, Adobe's portable document format (PDF), email, XML, and the like.

In the context of traditional publications, a common document is an article such as a news article, a human-interest article, and the like. In the context of the Internet, a common document is a Web page. Web pages often include content and may include embedded information such as meta information hyperlinks, and the like. Web pages also may include embedded instructions such as Javascript. In many cases, a document has a unique, addressable, storage location and can therefore be uniquely identified by this addressable location. A universal resource locator (URL) is a unique address used to access information on the Internet.

For the sake of simplicity and clarity, the term "source" refers to an entity that has published a document.

A. ENVIRONMENT AND ARCHITECTURE

Figure 1:
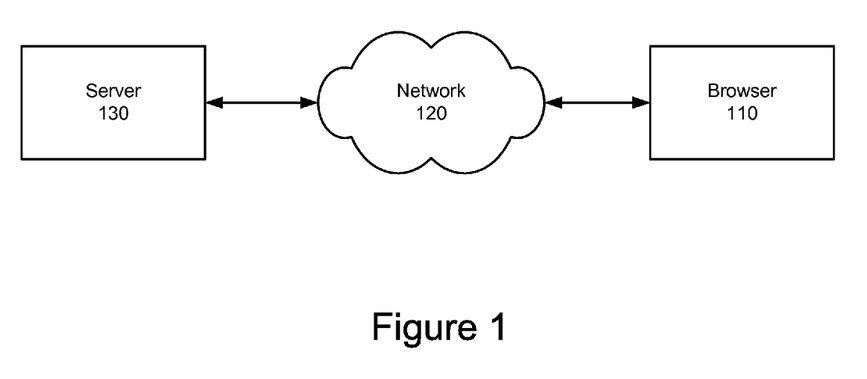
FIG. 1 is a diagram illustrating an environment within which the invention may be implemented.

FIG. 1 is a diagram illustrating an environment within which the invention may be implemented. The environment includes a client 110, a network 120, and a server 130.

The client 110 may be utilized by a user that submits a query to the server 130 and a user that retrieves information in response to the query. In one embodiment, the information includes documents which may be viewable by the user through the client 110. In one embodiment, the information includes documents which are ranked, sorted, and optimized to provide useful information to the user. The parameters that are utilized to analyze each document may include the recency of the document, the source of the document, the importance of the content within the document, and the like.

In one embodiment, the client 110 may be a web browser, and the server 130 includes a ranking system.

The network 120 functions as a conduit for transmissions between the client 110 and the server 130. In one embodiment, the network 120 is the Internet. In another embodiment, the network 120 may be any type of transmission means.

The server 130 interfaces with the client 110 through the network 120. The ranking system may be within the server 130. The ranking system may include additional elements. In one embodiment, the ranking system performs a variety of functions such as analyzing documents and sources of the documents which are explained in more detail below and shown in reference to FIGS. 3 through 7.

Figure 2:
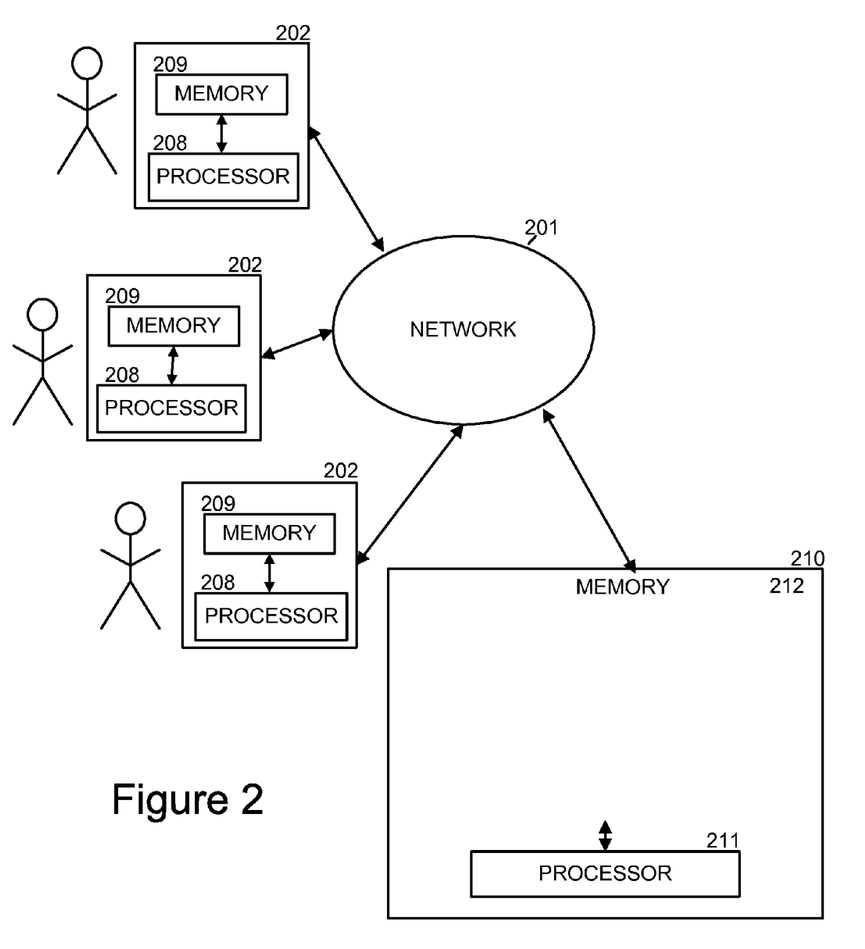
FIG. 2 is a simplified block diagram illustrating one embodiment in which the invention may be implemented.

FIG. 2 is a simplified diagram illustrating an exemplary architecture in which the present invention may be implemented. The exemplary architecture includes a plurality of web browsers 202, a server device 210, and a network 201. In one embodiment, the network 201 may be the Internet. The plurality of web browsers 202 are each configured to include a computer-readable medium 209, such as random access memory, coupled to a processor 208. Processor 208 executes program instructions stored in the computer-readable medium 209. In another embodiment, the plurality of web browsers 202 may also include a number of additional external or internal devices, such as, without limitation, a mouse, a CD-ROM, a keyboard, and a display.

Similar to the plurality of web browsers 202, the server device 210 may include a processor 211 coupled to a computer-readable medium 212. The server device 210 may also include a number of additional external or internal devices, such as, without limitation, a secondary storage element, such as database 240.

The plurality of target processors 208 and the server processor 211 can be any of a number of well known computer processors, such as processors from Intel Corporation, of Santa Clara, Calif. In general, the plurality of web browsers 202 may be any type of computing platform connected to a network and that interacts with application programs, such as a personal computer, a mobile lap top, a personal digital assistant, a "smart" cellular telephone, or a pager. The server 210, although depicted as a single computer system, may be implemented as a network of computer processors.

The plurality of web browsers 202 and the server 210 may include the ranking system 130 (FIG. 1). In one embodiment, the plurality of computer-readable medium 209 and 212 may contain, in part, portions of the server 130. Additionally, the plurality of web browsers 202 and the server 210 are configured to send and receive information for use with the server 130. Similarly, the network 201 is configured to transmit information for use with the server 130.

B. OPERATION

The flow diagrams as depicted in FIGS. 3, 4, 5A, 5B, 6, and 7 illustrate one embodiment of the invention. In each embodiment, the flow diagrams illustrate one aspect of processing documents and/or sources of documents using the ranking system.

The blocks within the flow diagram may be performed in a different sequence without departing from the spirit of the invention. Further, blocks may be deleted, added, or combined without departing from the spirit of the invention.

Figure 3:
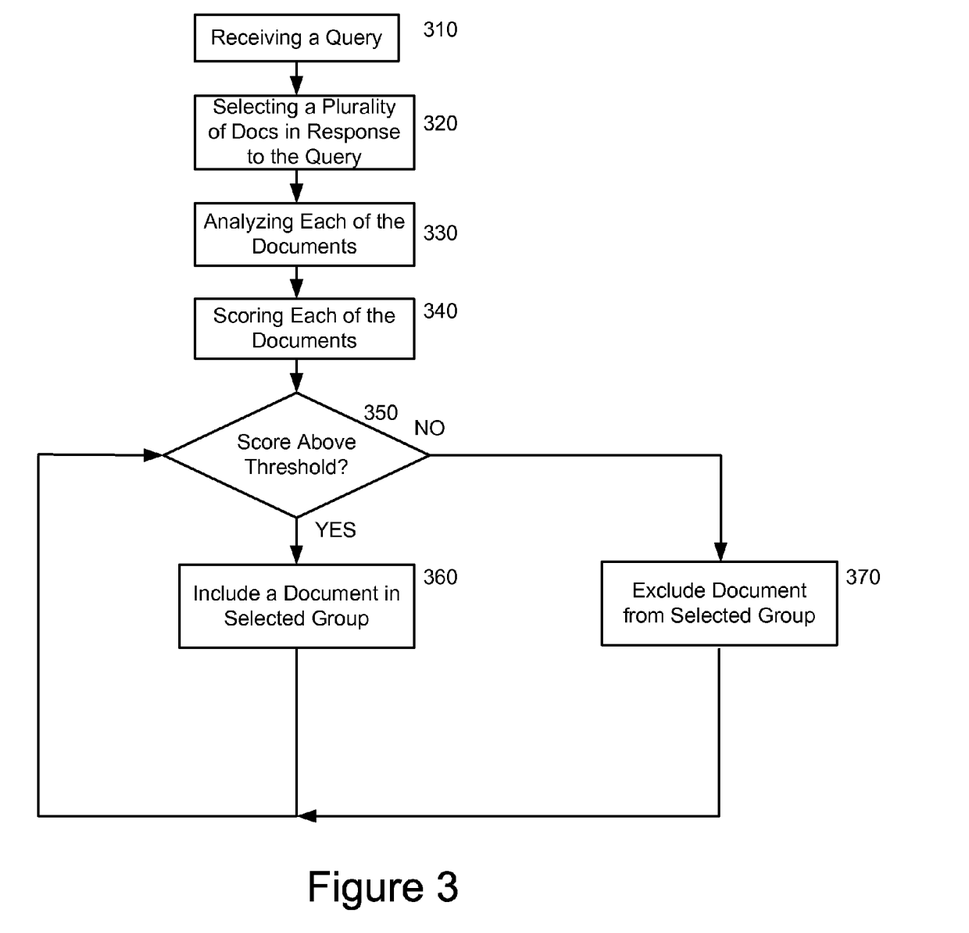
FIG. 3 is a flow diagram for ranking documents, consistent with one embodiment of the invention.

The flow diagram in FIG. 3 illustrates one embodiment of ranking documents in response to a query. In Block 310, a query is received by the ranking system. The query may include one or more search terms. For example, the query may include a variety of terms such as "transportation, "sports cars", "Porsche", and the like. The query may originate under the instruction from a user of the browser 202. The query may be transmitted over the network 201.

In Block 320, the ranking system may select qualified documents in response to the query. A document may be selected as a qualified document based on the content or subject matter of the document when compared to the query. The content or subject matter may include graphical and textual content. In addition, the document may also be selected as a qualified document based on a review or summary of the document. Further, the document may be selected as a qualified document based on a variety of factors such as the author of the document and the source of the document. Any combination of the above criteria for selecting a document as a qualified document may be utilized.

To identify qualified documents, the ranking system may search multiple databases and sources through the network 201 including but not limited to the medium 212 within the server 210 for these qualified documents. In another example, the ranking system may limit searching for the documents to the medium 212 within the server 210.

It may be desirable to be over-inclusive in selecting a document as a qualified document based on the query. By selecting a document as a qualified document in the Block 320, the document is not necessarily viewed by the user initiating the query.

In Block 330, an analysis may be performed on each of the qualified documents from the Block 320. For example, the analysis may be performed by the ranking system. The analysis may occur either within the server 210 or remotely from the server 210.

The analysis of the qualified documents may include a variety of parameters such as importance of the source of the document, freshness of the document, originality of the document, quality of the source, relevance of the source, number of sources reporting, recency of the coverage, diversity of the reporting, and relevance of the cluster. Details of these parameters are discussed in further detail below and in association with FIGS. 4 and 5.

In Block 340, each of the documents may be scored based on the analysis performed in the Block 330. The score of each document may be expressed in terms of a numerical score. For example, the score may be between "0" and "1"

expressed in terms of a decimal number such as 0.51, 0.98, and 0.32. The documents which are scored are identified in the Block 320.

In one embodiment, the score is calculated by adding up the scores attributed by the parameter analyzed in the Block 330. In one embodiment, these scores may be stored within the database 140.

In Block 350, the score of the document may be compared against a threshold score. This threshold score may be set at any determined value. In one embodiment, the threshold score may be based on the subject matter of the query. For example, a query related to a popular subject matter such as "cars" may have a higher threshold score than a query related to a less popular subject matter such as "geese migration patterns".

In addition, the threshold score may also be based on the number of qualified documents identified within the Block 320. For example, the threshold score may be set higher when there are a larger number of qualified documents identified within the Block 320. The scores of each qualified document as identified in the Block 320 may be compared against the threshold score.

If the score of the qualified document is greater than the threshold score, the corresponding document may be included within a selected group in Block 360.

If the score of the qualified document is less than the threshold score, the corresponding document is excluded from the selected group in Block 370.

A list of documents within the selected group may be displayed to the user who requested the query. This list of documents may be ordered according to the score of each document. For example, the list of documents may be displayed with the highest scored document first and followed by each successively scored document. The actual score may be shown next to each document within the list.

In addition to the list of documents within the selected group being displayed, the qualified documents identified by the Block 320 but not included within the selected group may also be displayed.

Figure 4:
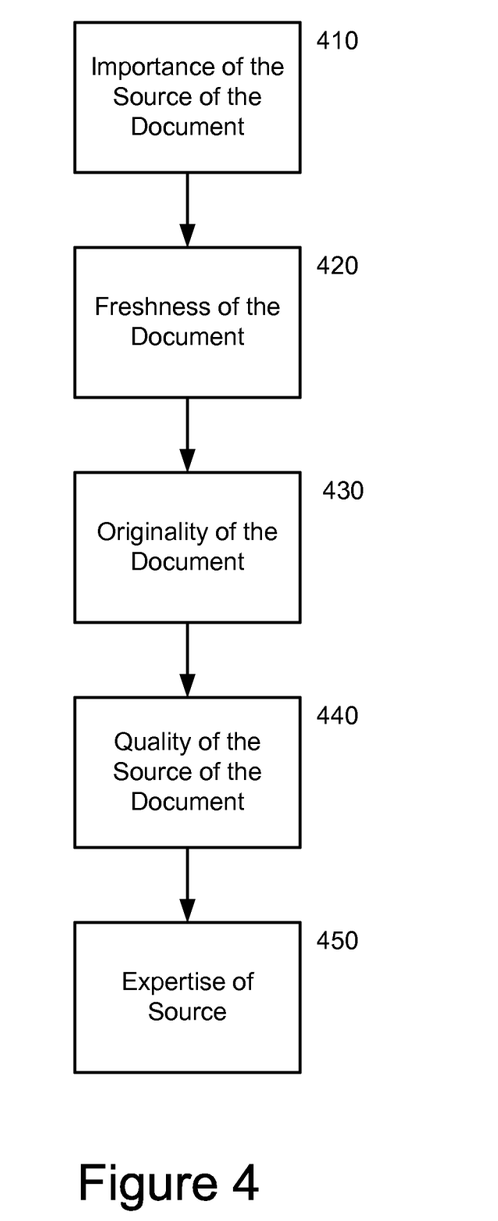
FIG. 4 is a flow diagram for analyzing parameters corresponding to the document, consistent with one embodiment of the invention.
Figure 5:
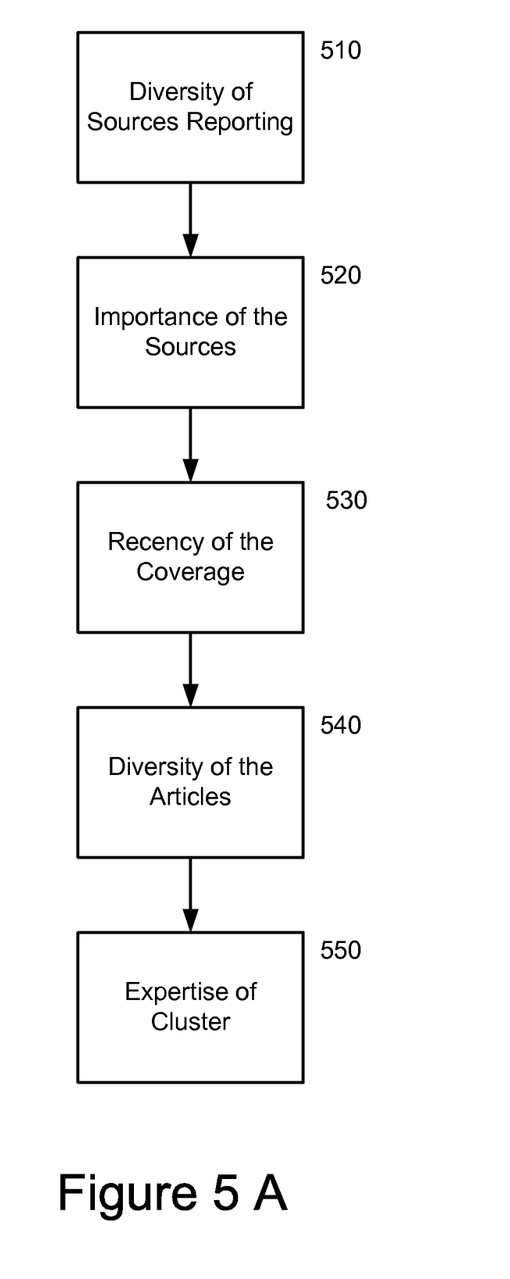
FIG. 5A is a flow diagram for analyzing parameters corresponding to the cluster, consistent with one embodiment of the invention.
FIG. 5B is a simplified block diagram illustrating one embodiment in which the invention may be implemented.

The flow diagram in FIG. 4 illustrates one embodiment of analyzing parameters of a document to determine the value of the document. In one embodiment, these parameters are utilized within the Block 330 (FIG. 3).

In Block 410, the importance of the source of the document is analyzed. The sources may be ranked in the order of their importance. For example, with a document relating to a news story, sources such as CNN, New York Times, and Los Angeles Times may be included with a top tier source category; sources such as the XYZ News and All News Times may be included in a second tier source category; and sources such as local news organizations may be included in, a third tier source category.

The importance of the sources may depend on the subject matter of the particular document and may change with each unique query. For example, with a query and associated documents relating to a local news story, the local news organizations where the event which is identified in the query is geographically located may be included within the top tier source category. These local news organizations would typically be included within the third tier source category for a national event/story which is not tied to the geographical area of the local news organization. However, due at least in part to the local nature of the event related to the query, these local news organizations may be elevated to the top tier source category for this particular query based on their geography.

Further, the importance of the sources may also change over a period of time for the same subject matter. The ranking of the sources based on importance may be a continual process that is periodically updated. In one embodiment, the importance of a source may be computed based on the number of views or hits received by the source. In another embodiment, the importance of a source may be computed based on the circulation statistics of the source.

In Block 420, the freshness of the document is computed. In one embodiment, the freshness of the document may be quantified by calculating the difference between the time of publication of the document and the time of the event which is the subject of the document. For example, a time stamp which is assigned to the document may serve as the time of publication. In addition, the freshness of the document may be measured by obtaining the earliest time of publication among multiple documents.

With respect to the organization according to freshness, these documents with similar time lags may be grouped together within the same category. For example, documents with publication times within one (1) day of the event may be considered recent. However, documents relating to very time-sensitive topics such as stock prices may be considered recent only if publication times are within five (5) minutes of the event.

In Block 430, the originality of the document is analyzed. If multiple documents have similar text, an original document may be determined by referring to the time of publication. A time stamp associated with the document may serve as the time of publication. In one example, the document which was published first may be considered the original document.

In Block 440, the quality of the source of the document is analyzed. The sources may be scored in the order of their quality. There are multiple ways to determine the quality of the source. For example, the quality of the source may be measured by awards received by the particular source. In another example, the quality of the source may be ranked by a third party.

In Block 450, the expertise of the source with respect to the query is analyzed. Typically, a source term vector describes the type of documents published by the source. In one example, the source term vector may, be utilized to determine the expertise of the source with respect to the query.

Additionally, the source term vector may also include a weighted set of terms. For example, if the query has the word "49er", the sources "ESPN" and "San Francisco Chronicle" may have a high score in the source term vector by the topical and regional focus, respectively.

The source term vector for a particular source may change over a period of time and may be updated periodically.

The flow diagram in FIG. 5A illustrates one embodiment of analyzing parameters of documents within a cluster and computing a cluster score for the documents within the corresponding cluster. These parameters shown in FIG. 5A relate to characteristics of a cluster associated with the document. In one embodiment, the cluster contains a plurality of documents which share a common theme. For example, a cluster may include documents which are related to Porsche cars. The parameters which relate to the cluster also play a role in scoring individual documents which are contained within the cluster.

A cluster score may be assigned to the documents within the cluster based on, in part, the parameters described within FIG. 5A. In addition, the cluster score may be related, in part, to a centroid corresponding to the cluster. In one embodiment, the following parameters may contribute to the cluster score and may be utilized within the Block 330 (FIG. 3).

In Block 510, the diversity of the sources contributing documents within the cluster is analyzed. To assist in describing the diversity of a source, the number of sources within a cluster is a parameter which may affect the importance of the cluster and the cluster score. For example, when a large number of sources contribute documents within the cluster, the cluster is typically a popular and/or an important topic. The cluster score assigned to the document within the cluster is also based on the diversity of sources contributing documents within the cluster.

Contributing to the diversity of the sources, the international diversity of the sources which contribute a document within the cluster may also influence the cluster score. For example, if there are sources from multiple countries for the documents within the cluster, a higher cluster score (based on the diversity of sources) may be assigned compared to a different cluster having documents authored by sources from a single country.

In another example, the importance of the country may also influence the cluster score when multiple clusters have sources from a similar number of countries contributing documents within their respective clusters.

In Block 520, the importance of the sources contributing documents within the cluster is analyzed. Various techniques for measuring the importance of a source are explained in association with the Block 410 in FIG. 4.

In Block 530, the recency of coverage within the cluster is analyzed. The most recent document published within the cluster may indicate the relevancy of the cluster. A time stamp of a document may establish the time of publication. For, example, a document within a cluster which has its most recent document published two (2) minutes ago may be assigned a higher cluster score with respect to recency within the cluster compared to a document within a different cluster which has its most recent document published more than two (2) years ago.

The recency of coverage may be computed for the cluster by using a weighted sum over the original documents within the cluster. In one example, a weighting scheme is utilized where a higher weight is given for fresher and more recent document.

In one embodiment, each document within a cluster may be sorted and assigned a bin that corresponds with the age of the document. Each bin is configured to accept documents within a time range and corresponds with a specific weighting factor. The specific weighting factor corresponds with the time range of the documents within the bin. In one embodiment, the weighting factor increases as the time range corresponds with more recent documents.

FIG. 5B illustrates the use of bins relative to the weighted sum in computing the recency of coverage. Bins 560, 565, 570, 575, and 580 are shown for exemplary purposes. Additional or fewer bins may be utilized without departing from the scope of the invention.

For example, the bin 560 may have a time range which includes documents that have aged less than 60 minutes. In this example, the documents within the bin 560 are assigned a weighting factor of 24. The bin 565 may have a time range which includes documents that have aged more than 60 minutes and less than 2 hours. In this example, the documents within the bin 565 are assigned a weighting factor of 20. The bin 570 may have a time range which includes documents that have aged more than 2 hours and less than 0.4 hours. In this example, the documents within the bin 570 are assigned a weighting factor of 15. The bin 575 may have a time range which includes documents that have aged more than 4 hours and less than 24 hours. In, this example, the documents within the bin 575 are assigned a weighting factor of 3. The bin 580 may have a time range which includes documents that have aged more than 24 hours. In this example, the documents within the bin 580 are assigned a weighting factor of −1.

Different weighting factors and time ranges may be utilized without departing from the scope of the invention.

In use, the cluster score may be calculated, in part, by multiplying the number of documents within each bin with the corresponding weighting factor and summing the results from each of these multiplications. For example, a cluster contains documents with the following distribution of documents: bin 560 contains 2 documents, bin 565 contains 0 documents, bin 570 contains 1 document, bin 575 contains 5 documents, and bin 580 contains 10 documents. A sample calculation for a cluster score, based on the sample weighting factors and document distribution as described above, is shown in Equation 1.

$$\text{sample cluster score} = 3 \times 24 + 0 \times 20 + 1 \times 15 + 5 \times 3 + 10 \times -1 \quad \text{Equation 1}$$

In Block 540, the diversity of documents within the cluster is analyzed. To assist in the determination of the diversity of documents, the overall number of documents within the cluster may be identified. Furthermore, within the overall total number of documents, duplicate documents may also be identified.

To more accurately find the diversity of documents, the original documents may be weighted more heavily with a higher score compared to the duplicate documents. For example, a cluster has a cluster score based on the diversity of documents within the cluster. In addition, a document within the cluster is also assigned the cluster score, because the cluster score has an impact on the overall score of the document.

In Block 550, the expertise of the cluster with respect to the query is analyzed. In many instances, the centroid may uniquely describe the topic of the cluster and may be utilized to determine the expertise of the cluster with respect to the query.

The centroid may be computed by averaging individual term vectors from the documents contained within the cluster published by the source. The term vectors may include a weighted set of terms. The centroid may change over a period of time and may be updated periodically.

Figure 6:
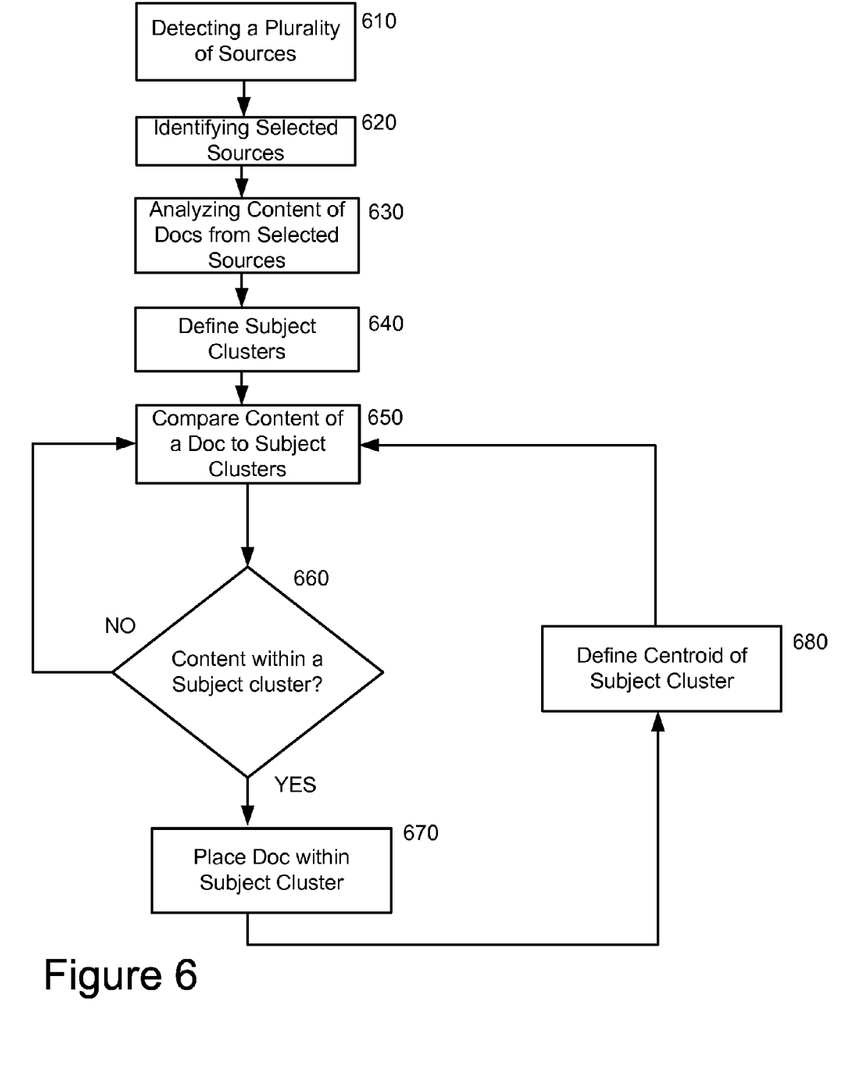
FIG. 6 is a flow diagram for forming a cluster, consistent with one embodiment of the invention.

The flow diagram in FIG. 6 illustrates one embodiment of defining a subject cluster and clustering documents within the subject cluster.

In Block 610, a plurality of sources are detected. The ranking system may detect the plurality of sources. In addition, the ranking system may also search multiple databases for sources through the network 201 including but not limited to the medium 212 within the server 210. In another example, the ranking system may limit searching for the sources to the medium 212 within the server 210.

In Block 620, a portion of the plurality of sources detected in the Block 610 are identified as selected sources. These selected sources may be chosen for a variety of factors such as the number of original documents by the source, recency of coverage, and relevancy of the documents. Details of these factors are discussed in further detail below in association with FIG. 7. The selected sources may be considered premier sources which are trusted and may be referred to as "golden sources".

In Block 630, content from documents from the selected sources are analyzed. For example, documents from the selected sources are identified, and the content from these documents is analyzed.

As part of the analysis, a topic or subject matter may be extrapolated from the analysis of the content from each of these documents originating from the selected sources. Each document may contains a document vector which describes the topic or subject matter of the document. In addition, the document vector may also contain a key term which characterizes the topic of the document.

In Block 640, subject clusters are defined. The subject clusters may be defined based, at least in part, on the topics found in the Block 630. For example, the subject clusters may be defined by the topics found within the documents published by the selected sources.

In use a subject cluster for a particular topic may be formed when a predetermined threshold is achieved. For example, the predetermined threshold may be defined to include X number of documents which belong to the particular topic for the subject cluster. In addition, the predetermined threshold may also be defined to include Y number or sources having at least one document belonging to the particular topic for the subject cluster.

In Block 650, content within a document is compared to each of the subject clusters. The subject clusters may be defined within the Block 640. In one embodiment, the document may originate from any of the sources detected in the Block 610. In another embodiment, the document may originate from any source.

In Block 660, if the content within the document is not part of one of the subject clusters and there are additional documents, then the content of another document may be compared with the subject clusters in the Block 650.

However, if the content within the document conforms with one of the subject clusters, then the document may be placed within the particular subject cluster in Block 670. Each subject cluster may have a topic which is unique to the particular subject cluster. In addition, the subject cluster may include one or more documents which have content which is either directly or indirectly related to the topic of the subject cluster.

In Block 680, a centroid of the subject cluster is defined. The centroid of the subject cluster is based on the topic of the subject cluster. For example, the centroid of the subject cluster may provide a summary of the topic or subject matter of the subject cluster. The centroid may allow the documents contained within the subject cluster to be scored according to a centroid score. For example, the centroid score may be obtained by averaging the term vectors from the documents within the subject cluster.

The centroid of the subject cluster may change over a period of time in response, at least in part, to documents contained within the subject cluster. For example, as documents are added to the subject cluster, the centroid of the subject cluster may be further refined by the topic of the documents.

If there are additional documents, then the content of another document may be compared with the subject clusters in the Block 650.

Figure 7:
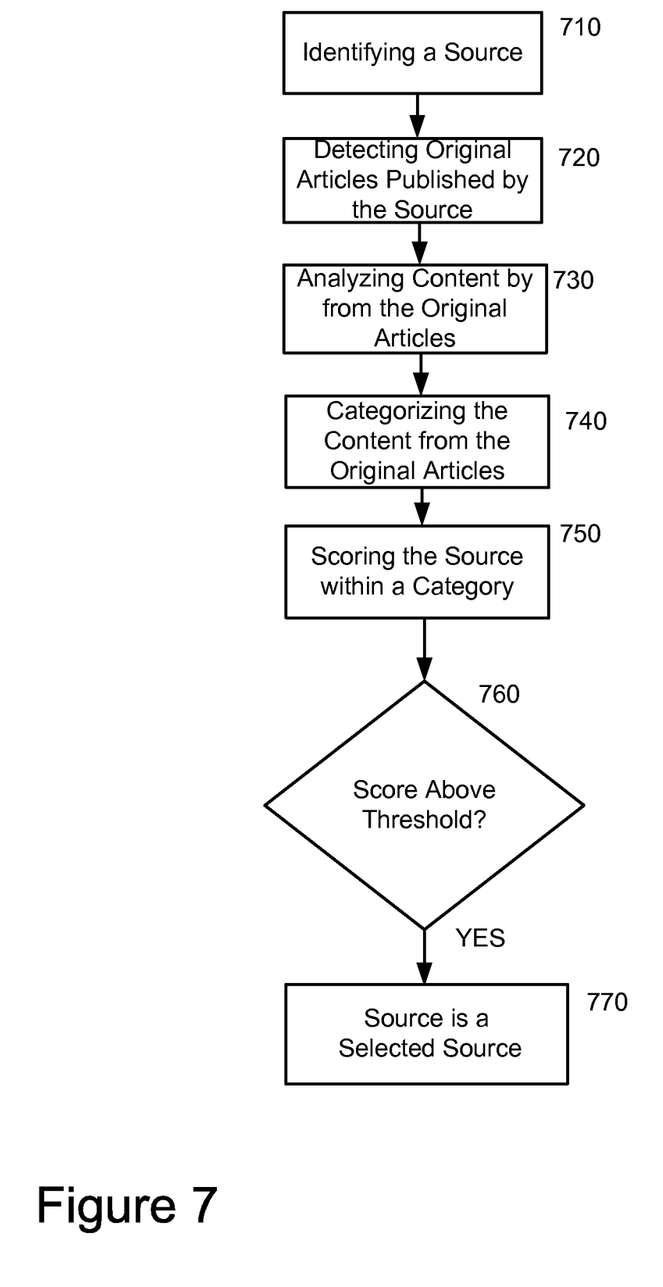
FIG. 7 is a flow diagram for choosing selected sources, consistent with one embodiment of the invention.

The flow diagram in FIG. 7 illustrates one embodiment for identifying selected sources. In one embodiment, identifying selected sources may be utilized within the Block 620 (FIG. 6). These selected sources may also be referred to as "golden sources".

In Block 710, a source is identified.

In Block 720, original documents which are published by the source are detected. To aide in retaining original documents, duplicate documents which are published by the source may be removed. For example, duplicate documents which are published more than once by the source may be removed so that only the original document remains. Duplicate documents may be found by comparing the text of the documents published by the source. If the text of both documents are a close match, then one of the documents may be considered a duplicate.

In addition, non-original documents which are published by the source may also be removed. For example, non-original documents may be found by comparing the text of the document published by the source and the text of another document published by a different source. If both documents area close match, the original document may be determined by finding the document with the earliest publication date.

In Block 730, the content of the original documents are analyzed. In one embodiment, each of the original documents may include a document vector which describes the content within the document.

In Block 740, the content of the original documents are categorized in response, at least in part, to the document vectors. In categorizing the original documents, categories with various levels of granularity may be utilized to organize the original documents. For example, the original documents may be categorized into groupings such as music, sports, and leisure activities. Within the music grouping, more detailed groupings may include: country music, rock music, hip hop music, rap music, and the like. The levels of granularity of the categories may be customized in response, at least in part, to the particular document vectors within the original documents. For example, if there is a substantial number of documents related to music, then more detailed sub-groupings may be useful.

To further assist in categorization, multiple levels of categories may be utilized to categorize the original documents. For example, one of the categories may include music; and the sub-categories for music may include: country music, rock music, hip hop music, rap music, and the like.

In Block 750, a score is assigned to the source for a particular category. The score may be determined in a number of ways such as by the number of original documents within the category and by the recency of the original documents within the category.

In Block 760, the score of the source for the category is compared to a threshold score. The actual threshold score may depend on the individual category. For example, a narrow or specialized category may have a lower threshold score compared to a threshold score of a popular category.

If the score of the source for the category exceeds the threshold score, the source is considered a selected source for the corresponding category in Block 770. In one embodiment, the source is included as part of a database of selected sources which is organized by category. In another embodiment, the source is included as part of a database of selected sources regardless of category. In either case, the database may be located within the server 210 or accessible to the server 210 over the network 201.

C. CONCLUSION

The foregoing descriptions of specific embodiments of the invention have been presented for purposes of illustration and description. For example, the invention is described within the context of documents as merely one embodiment of the invention. The invention may be applied to a variety of other electronic data such as pictures, audio representations, graphic images, and the like.

For the sake of clarity, the foregoing references to "browser" are a figurative aid to illustrate a particular device which is utilized by a specific user.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method performed by one or more server devices, the method comprising:
   identifying, by the one or more server devices, a document;
   analyzing, by the one or more server devices, a measure of originality of the document, the measure of originality based upon a similarity of text of the document to one or more other documents;
   analyzing, by the one or more server devices, a recency of coverage associated with the document, the recency of coverage being based on a time of publication of the document electronically via a network;
   analyzing, by the one or more server devices, a freshness of the document, the freshness of the document being a difference between the time of publication of the document and a time of an event which is a subject of the document;
   determining, by the one or more server devices, a score for the document based on analyzing the measure of originality, analyzing the freshness of the document, and analyzing the recency of coverage,
   the score for the document based upon a cluster score for a cluster that includes the document, the cluster score from a weighting factor associated with the particular period of time, and a quantity of the document and the one or more particular documents in the cluster; and
   ranking, by the one or more server devices and based on the score, the document relative to the one or more other documents, the document being included among documents to be provided for display based on a search query when the score exceeds a threshold, the threshold being based on a subject matter of the search query.

2. The method of claim 1, where the network includes the Internet, the method further comprising:
   receiving the search query; and
   including, based on the score, the document among the documents to be provided for display based on the search query, the documents being identified based on the search query.

3. The method of claim 2, where including the document in the documents includes:
   determining that the score exceeds the threshold,
   where the threshold is based on a measure of popularity of the subject matter; and
   including the document among the documents based on determining that the score exceeds the threshold.

4. The method of claim 1, further comprising:
   analyzing at least one of a measure of importance of a source of the document or a measure of quality of the source,
   where determining the score for the document includes:
     determining the score for the document further based on analyzing the at least one of the measure of importance of the source or the measure of quality of the source.

5. The method of claim 1, further comprising:
   including the document with one or more particular documents based on the time of publication,
   the time of publication being associated with a particular period of time, and
   a time of publication, of the one or more particular documents, being associated with the particular period of the time.

6. The method of claim 1, further comprising: determining whether content of the document is associated with a topic of the particular cluster of a plurality of clusters; and including the document in the particular cluster when the content of the document is associated with the topic of the particular cluster, the score, for the document, being determined based on the cluster score for the particular cluster.

7. A non-transitory computer-readable medium storing instructions, the instructions comprising:
   one or more instructions which, when executed by one or more processors, cause the one or more processors to:
     identify a document;
     analyze a measure of originality of the document, the measure of originality based upon a similarity of text of the document to one or more other documents;
     analyze a recency of coverage of the document, the recency of coverage being based on a time of publication of the document via the Internet;
     analyze a freshness of the document the freshness of the document being a difference between the time of publication of the document and a time of an event which is subject of the document;
     determine a score for the document based on analyzing the measure of originality, analyzing the freshness of the document and analyzing the recency of coverage, the score for the document based upon a cluster score for a cluster that includes the document, the cluster score from a weighting factor associated with the particular period of time, and a quantity of the document and the one or more particular documents in the cluster;
     and rank, based on the score, the document relative to one or more other documents, the document being included in documents to be provided for display based on a search Query when the score exceeds a threshold, the threshold being based on a subject matter of the search query.

8. The non-transitory computer-readable medium of claim 7, where the one or more instructions to identify the document include one or more instructions to identify the document based on the search query, and
   where the instructions further comprise:
     one or more instructions to determine whether to include, based on the score, the document among the documents to be provided for display based on the search query,
     the documents being identified based on the search query.

9. The non-transitory computer-readable medium of claim 8, where the one or more instructions to determine whether to include the document among the documents include:
one or more instructions to include the document among the documents when the score exceeds the threshold, the threshold being based on a measure of popularity of the subject matter of the search query,
the document being excluded from the documents to be provided for display when the score does not exceed the threshold.

10. The non-transitory computer-readable medium of claim 7, the instructions further comprising:
one or more instructions to assign the document to a particular bin based on the time of publication,
the time of publication being associated with a particular period of time, and
a time of publication, of one or more documents assigned to the bin, being associated with the particular period of the time.

11. The non-transitory computer-readable medium of claim 7, where the weighting factor is based on the particular period of the time.

12. The non-transitory computer-readable medium of claim 7, where the instructions further comprise:
one or more instructions to analyze at least one of a measure of quality of a source of the document, a measure of expertise of the source, or a measure of importance of the source,
where the one or more instructions to determine the score for the document include:
one or more instructions to determine the score for the document further based on analyzing the at least one of the measure of quality of the source, the measure of expertise of the source, or the measure of importance of the source.

13. A system comprising: one or more server devices to:
identify a document;
analyze a measure of originality of the document, the measure of originality based upon a similarity of text of the document to one or more other documents;
analyze a recency of coverage of the document, the recency of coverage being based on a time of publication of the document via a network;
analyze a freshness of the document the freshness of the document being a difference between the time of publication of the document and a time of an event which is subject of the document;
determine a score for the document based on analyzing the measure of originality, analyzing the recency of coverage, and analyzing the freshness of the document, the score for the document based upon a cluster score for a cluster that includes the document, the cluster score from a weighting factor associated with the particular period of time, and a quantity of the document and the one or more particular documents in the cluster; and
rank, based on the score; the document relative to one or more other documents.

14. The system of claim 13, where the one or more server devices are further to:
assign the document to a particular bin based on the time of publication,
the time of publication being associated with a particular period of time, and
a time of publication, of one or more documents assigned to the bin, being associated with the particular period of the time.

15. The system of claim 13, where the one or more server devices are further to:
analyze a plurality of documents;
identify a topic associated with the plurality of documents; define the cluster based on the topic;
determine that content of the document is related to the topic; and include the document in the cluster based on determining that content of the document is related to the topic.

16. The system of claim 13, where the weighting factor is based on the particular period of the time.

17. The system of claim 13, where the one or more server devices are further to:
analyze at least one of a measure of quality of the source or a measure of importance of the source,
where, when determining the score for the document, the one or more server devices are to:
determine the score for the document further based on analyzing the at least one of the measure of quality of the source or the measure of importance of the source.

* * * * *

UNITED STATES PATENT AND TRADEMARK OFFICE
CERTIFICATE OF CORRECTION

| | | |
|---|---|---|
| PATENT NO. | : 9,477,714 B1 | |
| APPLICATION NO. | : 14/488795 | |
| DATED | : October 25, 2016 | |
| INVENTOR(S) | : Krishna Bharat et al. | |

It is certified that error appears in the above-identified patent and that said Letters Patent is hereby corrected as shown below:

In the Specification

In Column 1, Line 45, please replace "shear" with --sheer--

In the Claims

In Column 12, Line 54, please replace "Query" with --query--

In Column 13, Line 36, after "comprising:" please insert a hard return

In Column 14, Line 28, after "ments;" please insert a hard return

In Column 14, Line 30, after "topic;" please insert a hard return

Signed and Sealed this
Seventeenth Day of January, 2017

Michelle K. Lee
*Director of the United States Patent and Trademark Office*